(12) United States Patent
Dickman

(10) Patent No.: US 12,476,913 B2
(45) Date of Patent: Nov. 18, 2025

(54) SUBNET COVERAGE BY GENERATING NETWORK ADDRESSES

(71) Applicant: MELLANOX TECHNOLOGIES, LTD., Yokneam (IL)

(72) Inventor: Yohad Dickman, Karmiel (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/375,621

(22) Filed: Oct. 2, 2023

(65) Prior Publication Data

US 2025/0112862 A1 Apr. 3, 2025

(51) Int. Cl.
| | |
|---|---|
| *H04L 45/748* | (2022.01) |
| *H04L 45/02* | (2022.01) |
| *H04L 61/5007* | (2022.01) |
| *H04L 101/668* | (2022.01) |

(52) U.S. Cl.
CPC ........... *H04L 45/748* (2013.01); *H04L 45/02* (2013.01); *H04L 61/5007* (2022.05); *H04L 2101/668* (2022.05)

(58) Field of Classification Search
None
See application file for complete search history.

(56) References Cited

U.S. PATENT DOCUMENTS

| | | | | |
|---|---|---|---|---|
| 7,107,265 | B1 * | 9/2006 | Calvignac | G06F 16/90344 |
| 7,624,164 | B2 * | 11/2009 | Lu | H04L 61/5092 |
| | | | | 709/220 |
| 10,230,639 | B1 * | 3/2019 | Patil | G06F 16/2246 |
| 11,356,409 | B1 * | 6/2022 | Ng | G06F 9/50 |
| 2005/0220054 | A1 * | 10/2005 | Meier | H04W 12/062 |
| | | | | 370/331 |
| 2014/0181274 | A1 * | 6/2014 | Bazin | H04L 61/5014 |
| | | | | 709/220 |
| 2017/0222906 | A1 * | 8/2017 | Johnsen | H04L 43/0876 |
| 2017/0222928 | A1 * | 8/2017 | Johnsen | H04L 49/358 |
| 2017/0324616 | A1 * | 11/2017 | Johnsen | H04L 47/20 |
| 2017/0324646 | A1 * | 11/2017 | Johnsen | H04L 12/66 |
| 2019/0327163 | A1 * | 10/2019 | Johnsen | H04L 49/358 |
| 2023/0269223 | A1 * | 8/2023 | Thubert | H04L 61/5007 |
| | | | | 709/245 |

* cited by examiner

*Primary Examiner* — Ranodhi Serrao
(74) *Attorney, Agent, or Firm* — Hogan Lovells US LLP

(57) ABSTRACT

Systems and methods for coverage of network addresses in a network enables a network end point to provide communication in the network based in part on a virtual arrangement of the network that includes a root node with a root counter and includes one or more sub-nodes with respective sub-node counters, where the virtual arrangement can be used to provide at least one network address that may be associated with a representative longest prefix match (LPM) having a prefix from the root node to a representative node and using a suffix that is based in part on a node level of the representative node with respect to the root node, and where the representative node can be a lower absent sub-node relative to a subnet node in the virtual arrangement.

20 Claims, 8 Drawing Sheets

SUBNET COVERAGE BY GENERATING NETWORK ADDRESSES

TECHNICAL FIELD

At least one embodiment pertains to providing a network address associated with a longest prefix match (LPM) using a virtual arrangement of nodes having respective counters to count network addresses associated therewith.

BACKGROUND

In a network different interconnect devices may be used to process incoming packets by matching the packets source and destination network addresses, such as Internet Protocol (IP), with route rules that may be defined in a routing table of the different interconnect devices. The matching of the network addresses may be based on a longest prefix match (LPM) algorithm. For example, when trying to cover all possible routing rules, such as for testing or for performance evaluation purposes, a generation of packets with at least a specific network address that is associated with an LPM match on each subnet of one of the route rules may be performed. However, generation of the specific network address that is an LPM on specific subnet and that is also not on other subnets is a high-complexity operation. There may be a requirement to determine such a specific network address, if it exists, by checking all network addresses in a subnet scope against all other subnets.

DETAILED DESCRIPTION

Figure 1:
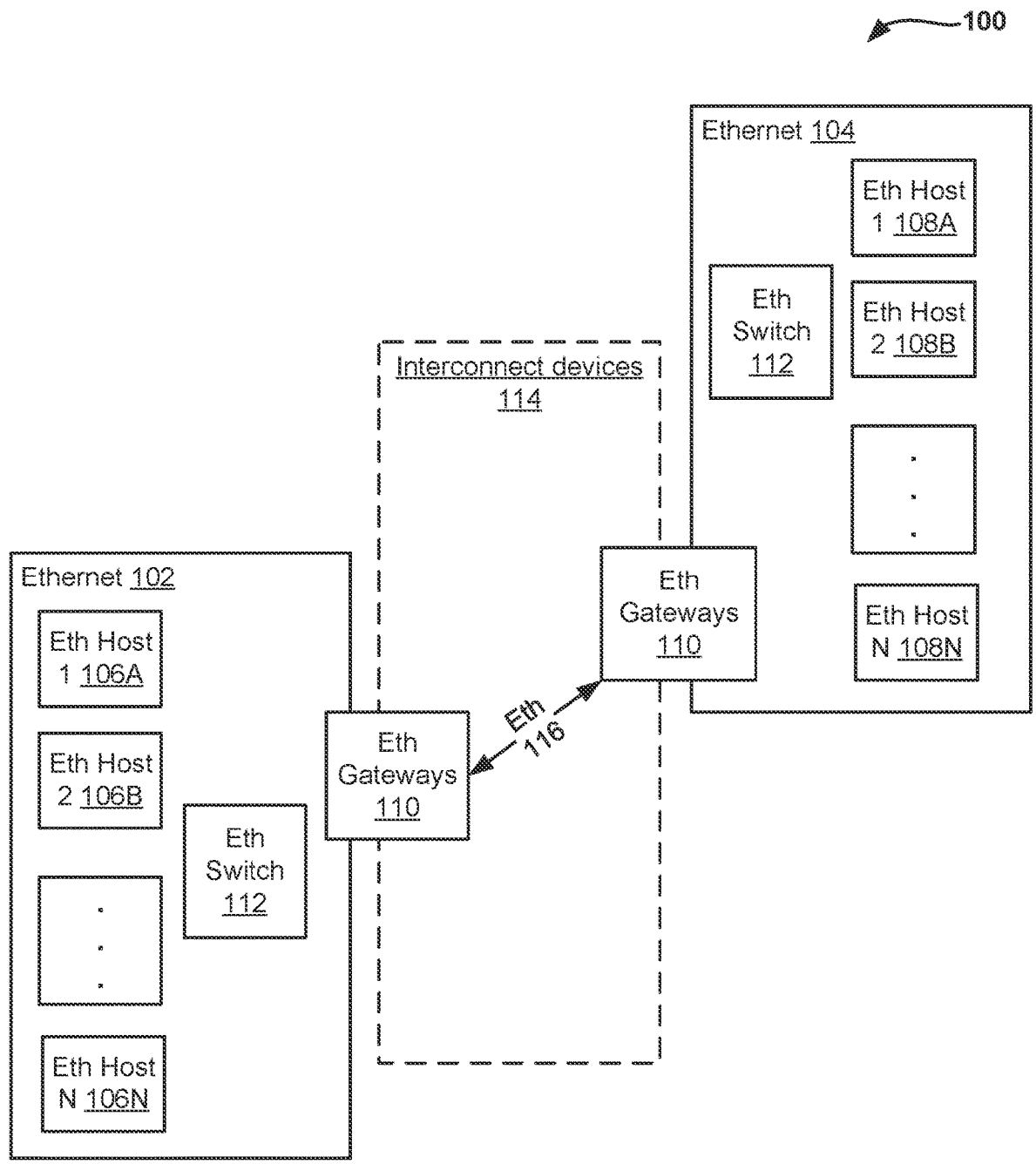
FIG. 1 illustrates a system that includes a network that is subject to providing a network address associated with an LPM using a virtual arrangement of nodes having respective counters, according to at least one embodiment.

In at least one embodiment, FIG. 1 illustrates a system that includes a network 100 that is subject to providing a network address associated with an LPM using a virtual arrangement of nodes having respective counters, as detailed herein. The reference to a node is either to a root node or a sub-node unless stated otherwise. The virtual arrangement of nodes having respective counters provides subnet coverage of the network 100 by generating or providing the network addresses for the LPM, as a network address classification, of a virtual arrangement. The virtual arrangement may be a simulation of the network 100 in a binary tree format, as in FIGS. 2-4. In one example, when trying to cover all possible routing rules, such as for testing or for performance evaluation purposes, it is possible to generate a network address that is an LPM for each configured routing subnet in low time complexity as each network address should include an LPM on a requested subnet, but not on any other subnet.

In at least one embodiment, such a system that is subject to providing a network address using a virtual arrangement of nodes having respective counters can be used to generate or provide the network address or to indicate that there is no such network address in a time complexity of O(1). The O(1) time complexity may be in reference to a constant time complexity, which may be a running time that is constant for an algorithm, such as an algorithm providing a network address associated with an LPM using a virtual arrangement of nodes, which can include respective counters, in the present system. The algorithm does not depend on a size of an input to achieve the O(1) time complexity. The achievement of a time complexity of O(1) allows for testing/performance environments to generate input packets in reasonable runtime for testing or for performance evaluation purposes.

In at least one embodiment, such a network in FIG. 1 enables all its routing subnets to be in a binary tree data type as the virtual arrangement of nodes has respective counters. The system manages counters on each node that can indicate how many addresses are being assigned to valid subnets for a node of the binary tree. Then, when searching for a network address that is an LPM for specific subnet, the virtual arrangement of nodes having respective counters can be traversed or traveled to at least one node that represents the specific subnet at issue. The traversing or traveling can continue on to further nodes of the virtual arrangement, such as, by selecting a child node that has a lower counter of the respective counters. When a node that has only one child node is reached and a location of another child node that is not presently in the tree may be used to represent a prefix of the LPM that is subject to the search. In at least one embodiment, to construct a full address of the network address associated with the LPM, an arbitrary suffix can be added to the prefix.

In at least one embodiment, therefore, network applications or utilities for a network may be developed for testing and performance analysis or other operations, where the network may be represented by a virtual arrangement of nodes having respective counters. The virtual arrangement may include subnet nodes that represent the last bit of the subnet prefix and may include nodes that represent one bit value in the bit representation of the subnet prefix. A counter for a node in the virtual arrangement accumulates a count of unique network addresses associated to it from within the node and from its sub-nodes. In other words, the counter counts all the unique addresses that are assigned to a subnet from within the node and from its sub-nodes. Then, network applications or utilities may use the virtual arrangement to perform analysis and/or changes to the network, in a virtual environment, and to enable feedback from the analysis or the changes to be applied to a physical structure of the network.

Figure 2:
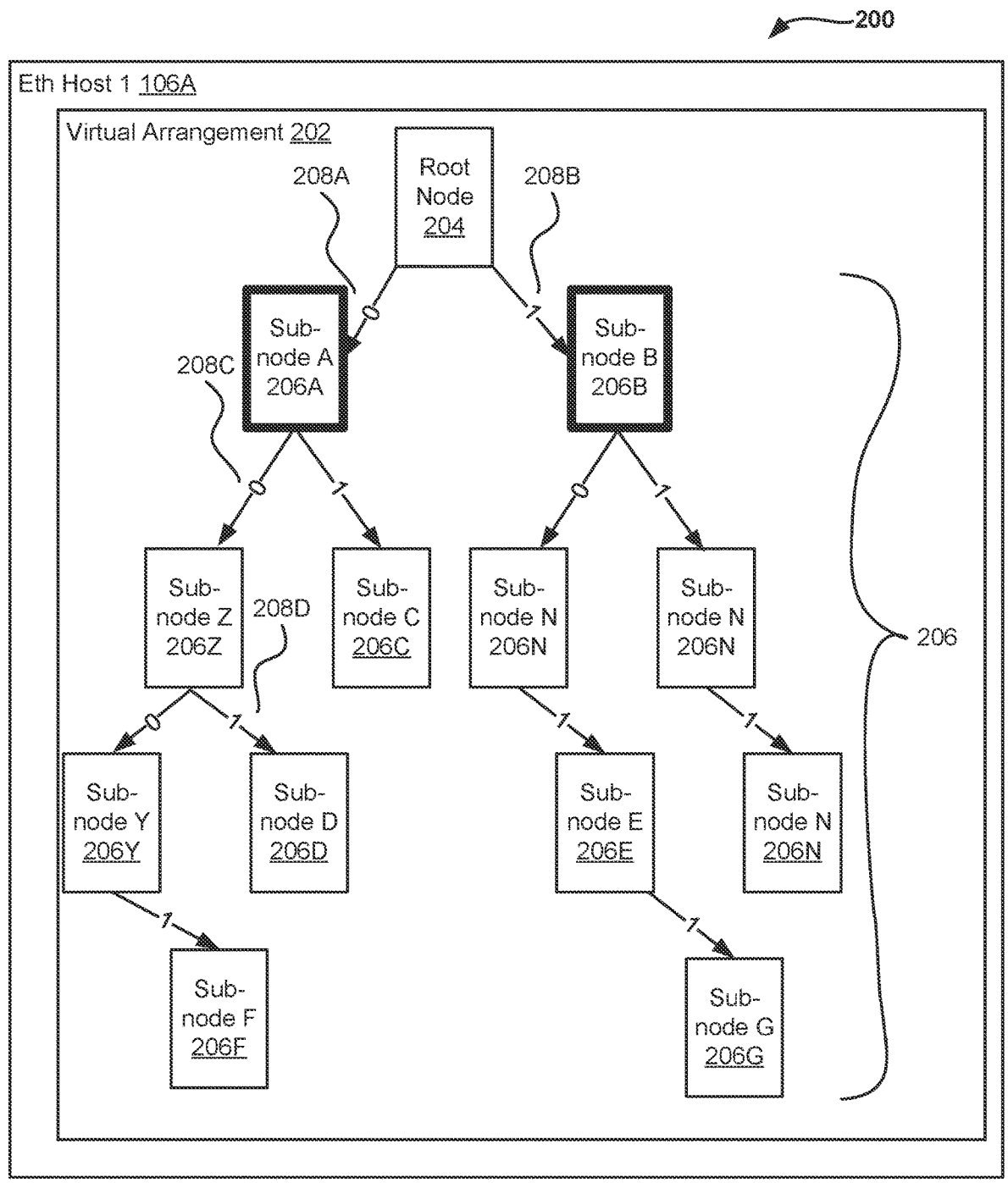
FIG. 2 illustrates aspects of a system having a virtual arrangement of nodes subject to respective counters for use in providing a network address, according to at least one embodiment.

Further, the virtual arrangement may be simulated as a binary tree, as in FIG. 2, having at least one root node with a root counter. The binary tree may have, under the root node, at least one sub-node. The simulation can be enabled using at least one processor that receives subnet addresses associated with network devices in a network, such as the network of FIG. 1, and that populates the virtual arrangement using only existing subnets from the network addresses. In the virtual arrangement, the root node includes a count of unique network addresses, such as in FIG. 3, that belong to it and that belong to all its sub-nodes. The virtual arrangement may be used to provide or generate a network address, as detailed in FIG. 5.

Further, it is possible to enable a change in the virtual arrangement to occur, such as one sub-node in the binary tree, such that all counters along a path having the sub-node subject to the change may be updated in a bottom-up approach. The update is to indicate a new number of unique network addresses associated in the network and particularly, in at least one sub-node. Network applications or utilities can benefit from information obtained by analyzing the virtual arrangement. For example, a packet may be generated with a network address from the tree to direct a packet to an intended subnet and to study aspects (such as, latency, drops, etc.) associated with the packet as it traverses the virtual arrangement. This is useful to configure or change a corresponding physical network, for instance.

In at least one embodiment, the system and method to provide a network address associated with an LPM using a virtual arrangement of nodes having respective counters can address issues of trying to cover all possible routing rules. The routing rules may be used for debugging, testing, or performance analysis of a network. The packets may have to be generated with network addresses, such as IP addresses, that are matched on each of different subnets using the LPM. The LPM may be an algorithm, such as described in connection with FIG. 2.

However, providing a network address that is an LPM on a specific subnet and that is not also an LPM on other subnets is a time and processor intensive operation. For example, to provide a network address for the specific subnet, there may be checks required that there are no LPM matches for a subnet network address to any other subnet of the network under test or study. In a worst case scenario, a check will be required to all subnet network addresses with all the available subnets. Further, the network address can be a match on more than one subnet, but it should not be a match on other subnet with a longer prefix than a match on the subnet under the search operation.

A solution to an LPM approach, using the system and method herein, enables the counters for sub-nodes and for a root node, in the virtual arrangement, to be such that each counter represents or accumulates a unique count of network addresses associated to it from within its sub-node or root node, as well as from all its child sub-nodes. This informs the higher sub-nodes of availability of specific network addresses in each lower sub-nodes. For example, from a counter of the unique count of network address associated to the node, the solution herein can find if and where there are available network addresses that are LPM for a node under a search operation.

In FIG. 1, multiple Ethernet hosts or host machines 1-N 106A-N, 1-N 108A-N of different Ethernet networks 102, 104 may interface with each other using switches or routers 112 and using gateways 110. One or more of such Ethernet hosts 1-N 106A-N, 1-N 108A-N may be able to provide a virtual arrangement of nodes having respective counters to represent one or more parts of a network 100 represented in FIG. 1. At least the gateways 110 may be part of devices generally referred to herein as interconnect devices 114. In an example, an Ethernet network 102; 104 is a local area network (LAN) and its switch or routers 112 may coordinate connectivity for its Ethernet hosts 1-N 106A-N or 1-N 108A-N. Further, the gateways may coordinate connectivity using Ethernet links 116 between different Ethernet networks 102, 104, which may represent a wide area network (WAN).

A switch or router 112 receives a packet, such as an IP packet, and performs a determination for a next-hop to forward the packet. The router or switch, and even a gateway, may include a routing table to perform such a determination. The determination may be based in part on a distance between next-hops, a metric, and a prefix length. Further, the distance may be associated with a trust value for a route associated with the next-hop. The switch or router may use a same prefix for a routing protocol that may rely on a metric to determine a best route to an eventual destination. A routing protocol may be associated with one or more metrics or may include different sub-routines used to determine the metric. An LPM represents a routing that may be in a form of an algorithm. The LPM in a router or a switch enables the router or switch to select a route associated with a longest prefix in the routing table.

In one example, for a given destination network address (such as, 192.168.1.X) of a received packet, a router or switch may use a routing table that provides different prefixes to route the packet in an egress route. The different prefixes may be represented, in a binary, to at least a part of the destination network address and may include a subnet mask that may be used to define a host address in the network address. The subnet mask is directed to a subnet that may be a smaller network within a network, such as, a LAN. The prefixes may match at least part of the destination network address, but at least one of the prefixes in the routing table may include bits that match a greatest number of bits of the destination network address. Such a match provides a prefix that is an LPM relative to the destination network address. In at least one embodiment, as used herein, however, an LPM determination is performed in a virtual arrangement of a network, such as a network 100 represented in FIG. 1. The virtual arrangement is to enable testing and other analysis associated with the network 100, which is detailed further with respect to FIGS. 2-7.

FIG. 2 illustrates aspects of a system 200 having a virtual arrangement 202 of nodes 204, 206 subject to respective counters for use in providing a network address, according to at least one embodiment. The system 200 includes at least one of the Ethernet hosts 1 106A to perform the virtual arrangement 202 using input provided from the network 100 or from a different network subject to testing or performance evaluation. A method using the virtual arrangement 202 is for generating a network address that is an LPM for each configured routing subnet, represented by the sub-nodes 206, in low time complexity. For example, each network address generated should be an LPM that is matched on a requested subnet and not on any other subnet. In at least one embodiment, FIG. 2 also illustrates the virtual arrangement 202 includes subnet nodes 206A, B, marked in bold lines, relative to sub-nodes 206C, N, Z, Y, etc. under the subnet nodes 206A, B. Although two subnet nodes are illustrated, there may be several more and there may be subnet nodes at different levels than illustrated.

The method in system 200 generates the network address or indicates that there is no network address providing a match in a time complexity of O(1). This information may be used in the testing or performance evaluation to generate input packets in reasonable runtime. For example, full testing coverage of all configured subnets in a routing or LPM implementation may be provided using the system 200. Still further, performance analysis may be provided using even distribution of network addresses between configured subnets. In at least one embodiment, detection of misconfigured subnets may be enabled using the virtual arrangement to determine that no valid LPMs exist as a representation of the misconfigured subnets. In addition, it is possible to generate random routing configuration with subnets that can individually provide indication of an LPM that is reachable as an input configuration for testing.

In at least one embodiment, as explained at least in respect to FIG. 1, switches, routers, or gateways can process incoming packets by matching the packets' source and/or destination network addresses against the route rules based in part on the LPM. However, when trying to cover all the configured routing rules (such as, for testing or performance analysis), packets may be generated with network addresses that are LPMs on each one of the rules subnets. Generation of network addresses that are at least an LPM on a specific subnet and not on other subnets may require checking of all the network addresses in the subnet scope with all other subnets. Table 1 illustrates data associated with the virtual arrangement 202, which may be in the form of a binary tree of subnets, also referred to herein as subnet-nodes or sub-nodes having at least one root node.

TABLE 1

| Subnet | Subnet/Sub-node prefix (bits) | Subnet/Sub-node Label |
|---|---|---|
| 0.0.0.0/1 | 0 | A |
| 128.0.0.0/1 | 1 | B |
| 64.0.0.0/2 | 01 | C |
| 32.0.0.0/3 | 001 | D |
| 160.0.0.0/3 | 101 | E |
| 16.0.0.0/4 | 0001 | F |
| 176.0.0.0/4 | 1011 | G |

In at least one embodiment, each entry in Table 1 may correspond to an outgoing interface or port of an Ethernet device, such as the switch, router, or gateway, of a network 100. A 32-bit network address, such as an IPv4 standard address may include many options that are aggregated to provide routes that are based on the subnet for the destinations intended for the packets. An entry in Table 1 includes a subnet mask, such as, that may be from 0 to 32, following the slash ("/") indication. The subnet mask indicates to any network device to look only at those bits in each packet's destination address. For example, in the above entries in Table 1, Subnet A, with a network destination of 0.0.0.0, includes a subnet mask of 1 that can be represented by one upper bit of the 32-bit network address. A subnet mask of 1 indicates that there is 1 binary bit represented in the subnet mask, which is a subnet mask address of 128.0.0.0 (one upper bit is set) of the 0.0.0.0 network address. The number of the binary bits are also referred to as the prefix length. Therefore, the subnet mask as the prefix lengths may be used to reduce an entry in the routing table and in the virtual arrangement 202. The virtual arrangement 202 is such that the nodes 206, including at least one subnet node 206A; 206B and any non-subnet nodes, are associated with a node level that is with respect to the root node 204 and that is associated with a subnet length or mask. For example, the node level represents a one-bit value in a bit representation of the subnet node and the subnet length or mask is used to determine a number of bits inserted to the bit representation.

In Table 1, there are different prefix lengths indicated and these are usually in a multiplication of 2 format. However, it is possible to use different prefix lengths from between 0 and 32 for IPV4 types of network addresses. In addition, a prefix length of 0 may be provided in a default routing of a provided table. The default routing may be used when there is no LPM in any entry that has a non-zero prefix and this may be used in practice as well as in simulation using the virtual arrangement 202 to indicate a lack of an LPM. In at least one embodiment, a prefix length of 32 may indicate that all bits of a network address having such a prefix lengthy should be used for matching of the routing.

Further, in Table 1, a root node 204 may be referenced as a default route and each node 204, 206 may include a location of a bit to test and at most two pointers 208A, 208B that branch based in part on a bit value of 0 or 1. The bit value indicates that each of the sub-nodes 206 has an attached route and includes next-hop information. In at least one embodiment, network address information itself may not be part of any of the nodes 204, 206, however the pointers coupled with the nodes themselves provide such network address information as described further using the Figures herein. The virtual arrangement 202 prunes or excludes any unused nodes to reduce any memory accesses to illustrate the routes. For example, certain sub-nodes D, 206D, F 206F, and G 206G include one or no further sub-nodes. In at least one embodiment, a system 200 for providing network addresses in a network includes one or more circuits that may be within a processor of an Ethernet host 1 106A. The one or more circuits can receive subnet addresses of the network 100 and can provide a virtual arrangement 202 of the subnet addresses using a root node 204 and with respect to sub-nodes 206.

In an application, a prefix length of 1 is indicative of either of sub-nodes 206A, 206B, whereas a prefix length of 2 is indicative of second layer sub-nodes, such as sub-node Z 206Z, which is in the same level of the binary tree as sub-node 206C. A prefix length of 3 is indicative of a third level of the binary tree that may be represented in bits as 001 or 111, as in Table 1, or in any other combination of bits, so long as a sub-node exists along the bit route. For example, in Table 1, 32.0.0.0/3 has 001 in the subnet mask bits, which is provided by traversing the binary tree starting from the root node 204, through a first bit 0 208A, through sub-node A 206A, through a second bit 0 208C, through sub-node Z 206Z, and through a third bit 1 208D to arrive at sub-node D 206D. Therefore, an LPM for 32.0.0.0/3 may be referenced by the information of sub-node D 206D.

In at least one embodiment, the virtual arrangement 202 can be used to generate a network address that is an LPM for a requested subnet. The binary tree may be generated for all routing subnet addresses, as received. For example, the binary tree is generated to represent prefix bits of each of the subnet addresses. Each level of the tree represents one bit from the subnet value, starting from a most significant bit (MSB). Further, one or more of the nodes 204, 206 of the virtual representation 202 may only be created for existing subnet addresses. A subnet value may be inserted, as a sub-node, to the binary tree in a bit-by-bit approach, according to the subnet length and/or mask of the subnet addresses received. A last bit node may be marked as subnet or subnet node in the virtual arrangement 202. In one example, for subnet node 160.0.0.0/3 in FIG. 2 and Table 1, a subnet value in bits may be provided as 1010 0000, 0*, where the "*" represents that a subnet of the network address is contained in the network address or that the subnet mask is encompassed by a parent root note or sub-node. For the example, a subnet length is 3 and a sub-node 206E will be inserted into a binary tree in a level that is according to a first tree (3) bits, that is along a 101 traversed path.

Figure 3:
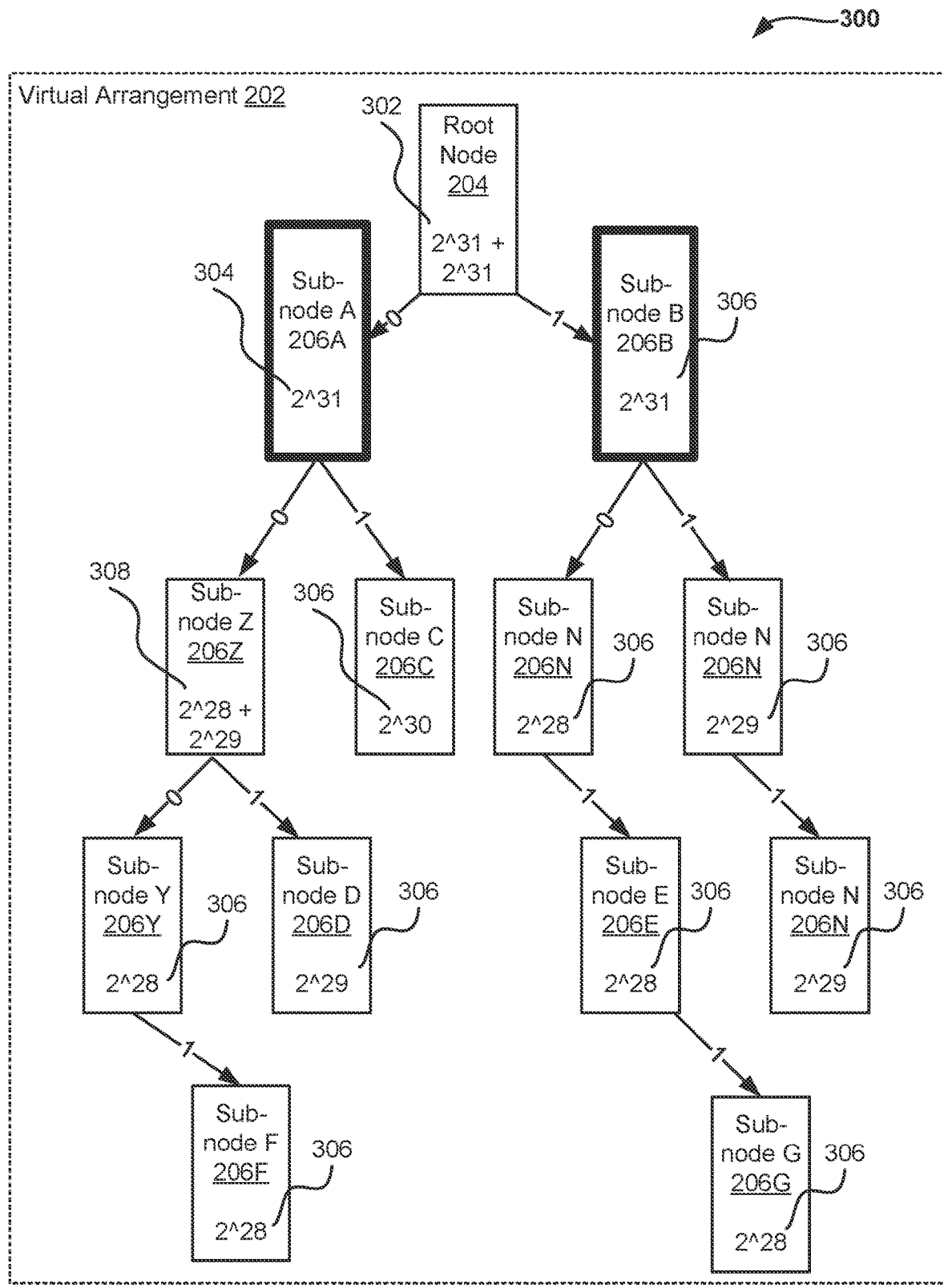
FIG. 3 illustrates aspects of a virtual arrangement of nodes having respective counters, according to at least one embodiment.

FIG. 3 illustrates aspects 300 of a virtual arrangement 202 of nodes having respective counters, generally marked as 302-306, according to at least one embodiment. The system 200 includes a virtual arrangement 202 in which a counter 302-306 per tree node can be managed to support changes in the virtual arrangement 202. Each node 204; 206A-N of the virtual arrangement 202 has a counter 302-306 that represents a number of assigned network addresses for the root node or sub-node and for all the sub-nodes in its subnets. Further, a counter on each root node or sub-node counts each address only once. When a node is a subnet node, its counter will include a value that may be $2^{(32-subnet\_len)}$, where subnet_len is in reference to the subnet length associated with the subnet node. When a node is not a subnet node, it may hold an accumulation 308 (or unique count) of all addresses in its sub-nodes (such as, the sub-nodes 206Z, for instance). The accumulation 308 is illustrated by an addition "+" symbol, in FIG. 3.

Therefore, the system 200, with the one or more circuits, provides the root counter 302 for the root node 204. The root counter 302 can include a first count that is of unique ones of the network addresses that belong to the one or more sub-nodes in the virtual arrangement 202, such as an accumulation of the different counts the belong to the one or more sub-nodes. The one or more circuits also provide the sub-node counters 304, 306 with respective sub-node counts that is of unique ones of the network addresses that belong to respective ones of the one or more sub-nodes 206A-N. The sub-node counters 304, 306 may include at least one subnet counter to further include respective subnet counts of the network address that belong to the subnet node.

In at least one embodiment, the one or more circuits also enable updates to the virtual arrangement. For example, the one or more circuits allow determination that a node is to be added to or removed from the network. This determination allows association or removal of a counter 302-306 for a node 204, 206. In at least one embodiment, a determination that a node is a subnet node or another sub-node in the virtual arrangement 202 allows the update to be performed to any of the root counter 302 or at least one of the sub-node counters 304, 306. The update may be to include at least a new count associated with the network addresses belonging to the node. For example, when adding a subnet node to the virtual arrangement, a traversal of the virtual arrangement may be performed. For a binary tree, the traversal may be performed by traveling on the binary tree node by node and by adding nodes, where missing nodes are determined. A last node may be marked as subnet node.

Further, an update to a subnet node counter may be performed by taking the node current value (such as, X) and updating it to a node new value (such as, Y) that may be $2^{(32-subnet\_len)}$. "X" may be defined as 0 when a subnet node is a new node. In at least one embodiment, an accumulation of a value given by a difference (such as, Y–X) may be performed for each counter from a sub-node and towards the root node till reaching a subnet node. However, a subnet node counter of a subnet node that is reached by traversal of the virtual arrangement is not updated, and only the underlying nodes may be updated. When removing a subnet node from the tree, if there are sub-nodes to the subnet node, then a "node subnet flag" may be unset followed by an update to associated node counters from a current value (such as, X) to a new value (such as, Y). An accumulation, represented by a sum of directed sub-node counters may be provided for the updates. Further, a reduction is performed (such as, X–Y) to each counter from a sub-node towards a root node till a subnet node is reached, where the counter of the subnet node is not subject to an update.

Alternate to a subnet node not including sub-nodes, then removing a subnet node may be performed by getting a node counter (such as, X) for the subnet node to be removed. Then, the subnet node may be deleted back towards a root node till a subnet node or sub-node (root node) with two children are reached. The node counter value of "X" may be removed from each counter all the way towards the root node till a subnet node is reached and which has a counter that is not subject to the update. In this manner, therefore, the system herein uses the one or more circuits to add or remove a determined sub-node to the virtual arrangement 202 and updates the counters 302-306 to represent, in the network addresses, the addition or removal of the determined sub-node.

In at least one embodiment, therefore, a first one 304, 306 of the sub-node counts may include a first determined value, such as, $2^{(32-subnet\_len)}$, for a first one of the one or more sub-nodes that is a subnet node. The first determined value is based in part on a subnet length or mask, given by "subnet_len," which may be associated with the subnet node 206A, 206B. Separately, a second one 308 of the sub-node counts includes a second determined value representing an accumulation ("+" sign in FIG. 3) of all of the network addresses that are unique for at least a second one 206Z of the one or more sub-nodes that is not a subnet node.

Figure 4:
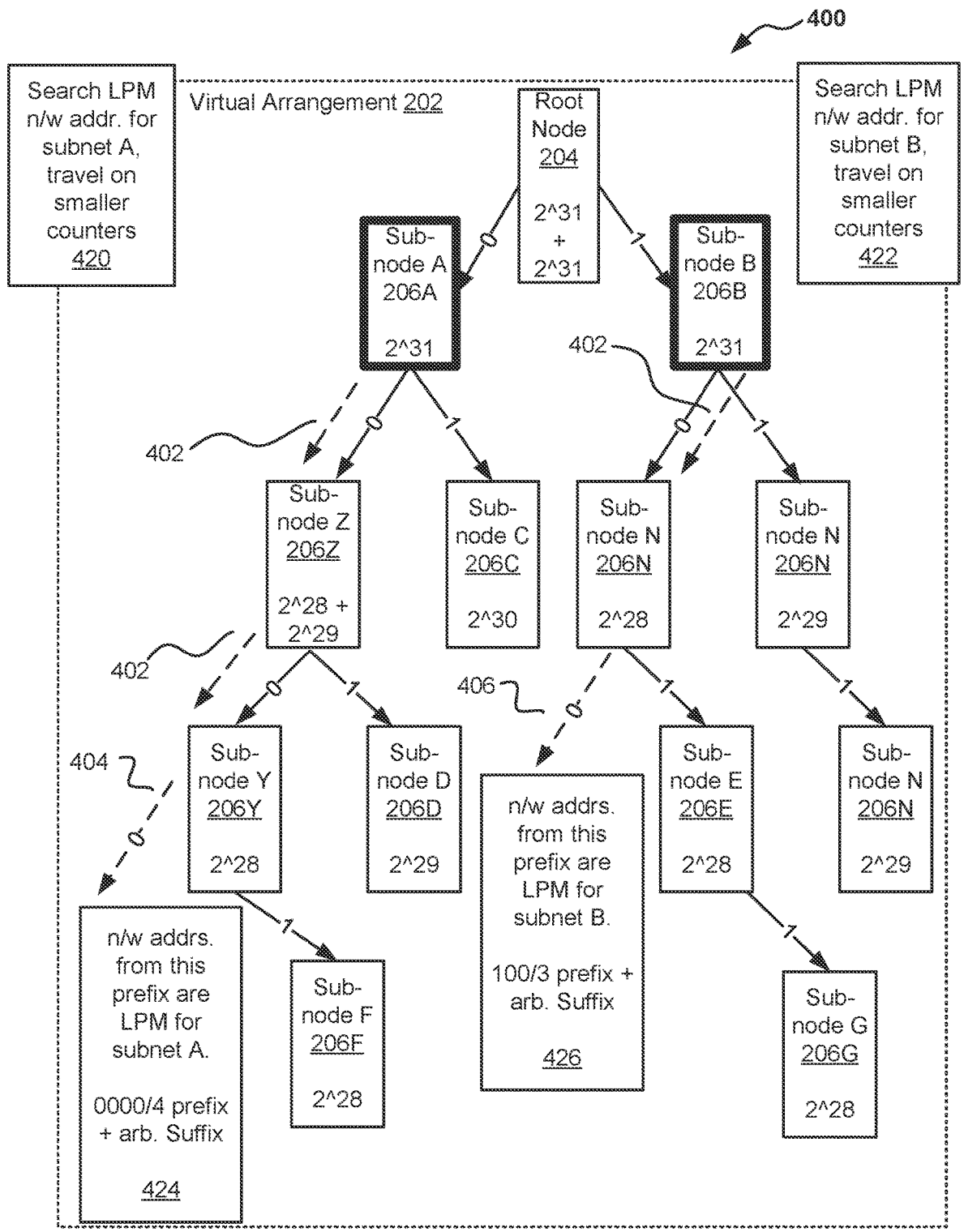
FIG. 4 illustrates aspects of a system for providing a network address associated with an LPM using a virtual arrangement of nodes having respective counters, according to at least one embodiment.

FIG. 4 illustrates aspects of a system 400 for providing a network address associated with an LPM using a virtual arrangement of nodes having respective counters, according to at least one embodiment. For example, the one or more circuits of a host processor that receives the subnet addresses of a network 100 can provide a virtual arrangement 202 of the subnet addresses using a root node 204 with a root counter 302 and one or more sub-nodes 206 having respective sub-node counters 304, 306. The virtual arrangement 202 can be used to provide at least one network address that is associated with a representative LPM. Further, the representative LPM includes a prefix from the root node 204 to a representative node and uses a suffix that is based in part on a node level of the representative node with respect to the root node. The representative node may be a lower absent sub-node relative to the subnet node 206A, 206B in the virtual arrangement.

In at least one embodiment, an interface may be provided for the system herein to receive a subnet address to generate the at least one network address that is associated with the representative LPM. The interface may be a character or graphical user interface that is associated with the same or a different host that provides the virtual arrangement. However, the virtual arrangement and the interface may be part of a cloud environment as described with respect to one or more embodiments herein. In one example, a search 420 for an LPM associated with a network address ("n/w addr.") for subnet A 206A may be enabled by traversing or travelling along the smaller counters, as detailed below. Similarly, a search 422 for an LPM associated with a network address ("n/w addr.") for subnet B 206B may be enabled by traversing or travelling along other smaller counters associated with subnet B. To generate a network address that may be an IP and that may be for the LPM of a requested subnet but that is also not on another subnet, the virtual arrangement 202 may be traversed 402 bit by bit until a sub-node (such as, node 206N) associated with the requested subnet is reached. Therefore, the virtual arrangement 202 is traversed to a sub-node for the subnet address.

For example, in the traversal, when it is determined that the subnet node (has an accumulation of its sub-node counters that is 2 (32-subnet_len), then it may be also determined that no network address can be LPM on this subnet. However, the traversal may be otherwise continued from subnet nodes to sub nodes to select a sub node that has a counter that is smaller than $2^{(32-node\_level)}$ till a sub node that has, under it, only one sub node. In one example, for a subnet that is represented by node 206A, the traversal is to reach the node 206A. Then, on finding that the node 206A has two sub-nodes 206Z and 206C, the approach herein is to select a sub node with counter that is smaller the counter for node 206Z ($2^{(32-node\_level)}$). The approach continues via path 402 to again find two sub nodes and to select a sub node with a counter that is smaller than the counter for node 206Y, for instance. When the traversal reaches the sub-node (such as a node 206Y), which has a smaller counter indicative of room for a further sub-node under this node 206Y, it may be used to provide the network address. For example, the approach herein is to find that the sub node 206Y has only one further sub-node 206F and when reaching such a sub-node 206Y, a bit that leads to a representative node 424 that is a non-existent (as yet) sub node, in the path 404 may be used to generate a network address using, in part, the traversed route 402, 404.

In one example, a network address may be generated from a prefix that may be an LPM for subnet A. For example, the node 206Y may include only bits 000/3 halong a path 402 and another bit 0 along a path 404 that is the path to the representative node 424. These bits together can be used to create the prefix 0000/4 and an arbitrary suffix may be included in a network address to generate network address that is LPM on subnet A. This is in response to a search 420 under subnet A 206A. Similarly, in response to the search 422 for an LPM associated with a network address for subnet B 206B, a path or route is traversed or travelled 402 along other smaller counters associated with subnet B. A network address may be generated from this prefix may be an LPM for subnet B. For example, as the path or route 402, 406 is traversed to get to the sub-nodes 206N, bits 10/2 for the route 402 and another bit 0 associated with route 406 may be the path to a representative node 426 (once again, being a sub-node that does not as yet exist or is a lower absent sub-node relative to the subnet node in the virtual arrangement). These bits taken together may be used to create the prefix 100/3 for the representative node 426 and an arbitrary suffix may be included in a network address to generate network address that is LPM on subnet B.

When there is a node that has only one sub-node under it, a network address with a prefix that represents an absent sub-node (a representative node in this case) may be generated and may be used with an arbitrary suffix. The suffix may be based in part on a node level of the representative node with respect to the root node. This network address is an LPM match on the requested subnet. However, in at least one embodiment, when a determination is made that the individual ones of the sub-node counts are equal to a determined value that is based in part on a subnet length associated with the two of the one or more sub-nodes (such as, $2^{(32-subnet\_len)}$), an indication may be provided that generation of the at least one network address is unavailable for the subnet address.

The one or more circuits can, therefore, receive a subnet address to generate at least one network address that is associated with the representative LPM and can traverse bit-by-bit to a subnet node for the subnet address. From the subnet node, the traversing 402 may be performed for every sub-node. A determination can be made that at least one of individual ones of the sub-node counts are also not equal to a determined value, which is based in part on a node level (such as, $2^{(32-node\_level)}$). As such, a sub-node may be provided as associated with the at least one of the individual ones of the sub-node counts, and where the individual ones of the sub-node counts is to be associated with the prefix of the generated network address for the subnet under the search operation.

In at least one embodiment, a number of operations for generation of the at least one network address is only based in part on a number of levels in the virtual arrangement 202. Further, the number of levels is associated with the one or more sub-nodes being at different levels with respect to the root node. In at least one embodiment, the subnet addresses received to the virtual arrangement may be provided from the network 100. The network may include at least one network interconnect device, such as a switch, a router, or a gateway to enable network communications. The virtual arrangement 202 may be populated based in part on the subnet addresses as detailed with respect to FIGS. 2-4 herein. Information for the root node or for the one or more sub-nodes may be generated using an input to the virtual arrangement and using the first counter and the sub-node counters. Further, a change in the network may be enabled, as discussed with respect to at least FIGS. 2 and 3, based in part on the information generated.

In at least one embodiment, the systems and methods herein enable testing and changes in a network subject to a virtual arrangement that has undergone performance analysis. The system for coverage of network addresses in a network 100 may include at least one network end point to provide communication in the network and to enable a change in the network based in part on an input to the at least one network end point. For example, based in part on the testing performed on a virtual arrangement of the network, the input to the network interconnect device can include a change to a routing table in the network interconnect device.

Figure 5:
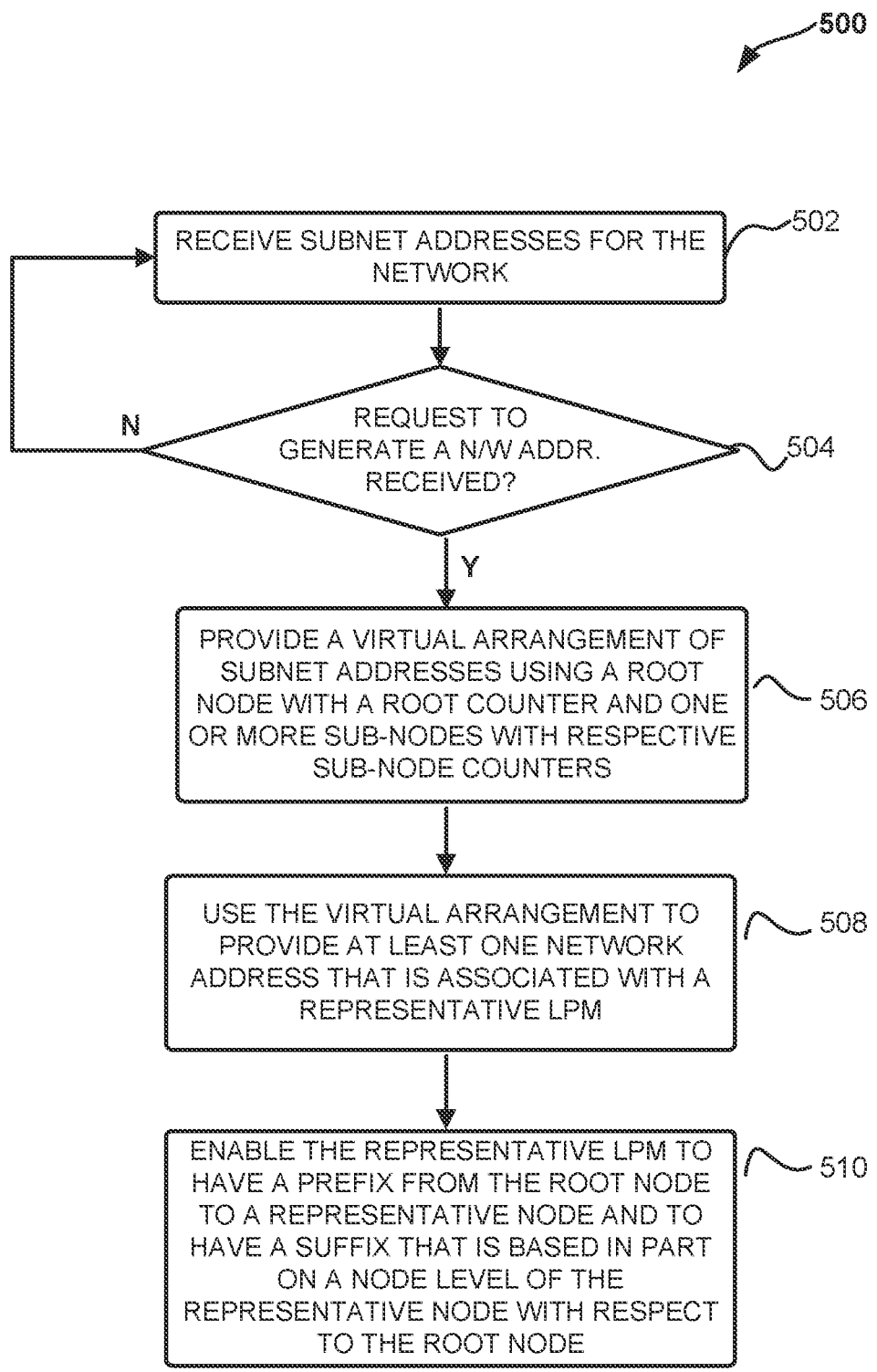
FIG. 5 illustrates a process flow for providing a network address associated with an LPM using a virtual arrangement of nodes having respective counters, according to at least one embodiment.

FIG. 5 illustrates a process flow or method 500 for providing a network address associated with an LPM using a virtual arrangement of nodes having respective counters, according to at least one embodiment. The method 500 includes receiving 502 subnet addresses for a network. A further request 504 may be made to generate a network address for the network. For example, during a testing or performance analysis of a network, packets may be generated to an intended subnet. Therefore, a network address to be associated with the packets may be generated. The method 500 includes providing 506 a virtual arrangement of the subnet addresses using a root node with a root counter and one or more sub-nodes with respective sub-node counters. The method 500 includes using 508 the virtual arrangement to provide at least one network address that is associated with a representative LPM. The representative LPM may be enabled 510 using a prefix from the root node to a representative node and the representative LPM using a suffix that is based in part on a node level of the representative node with respect to the root node. This allows deep testing and performance analysis of a network using the virtual arrangement herein.

In at least one embodiment, the method 500 may include a further step or sub-step for providing the root counter to include a first count that is of unique ones of the network addresses that belong to the one or more sub-nodes in the virtual arrangement. Another step or sub-step of the method 500 includes providing the sub-node counters to include respective sub-node counts that is of unique ones of the network addresses and that belong to respective ones of the one or more sub-nodes. The sub-node counters can include at least one subnet counter, which in turn can include respective subnet counts of the network address that belong to the subnet node.

Figure 6:
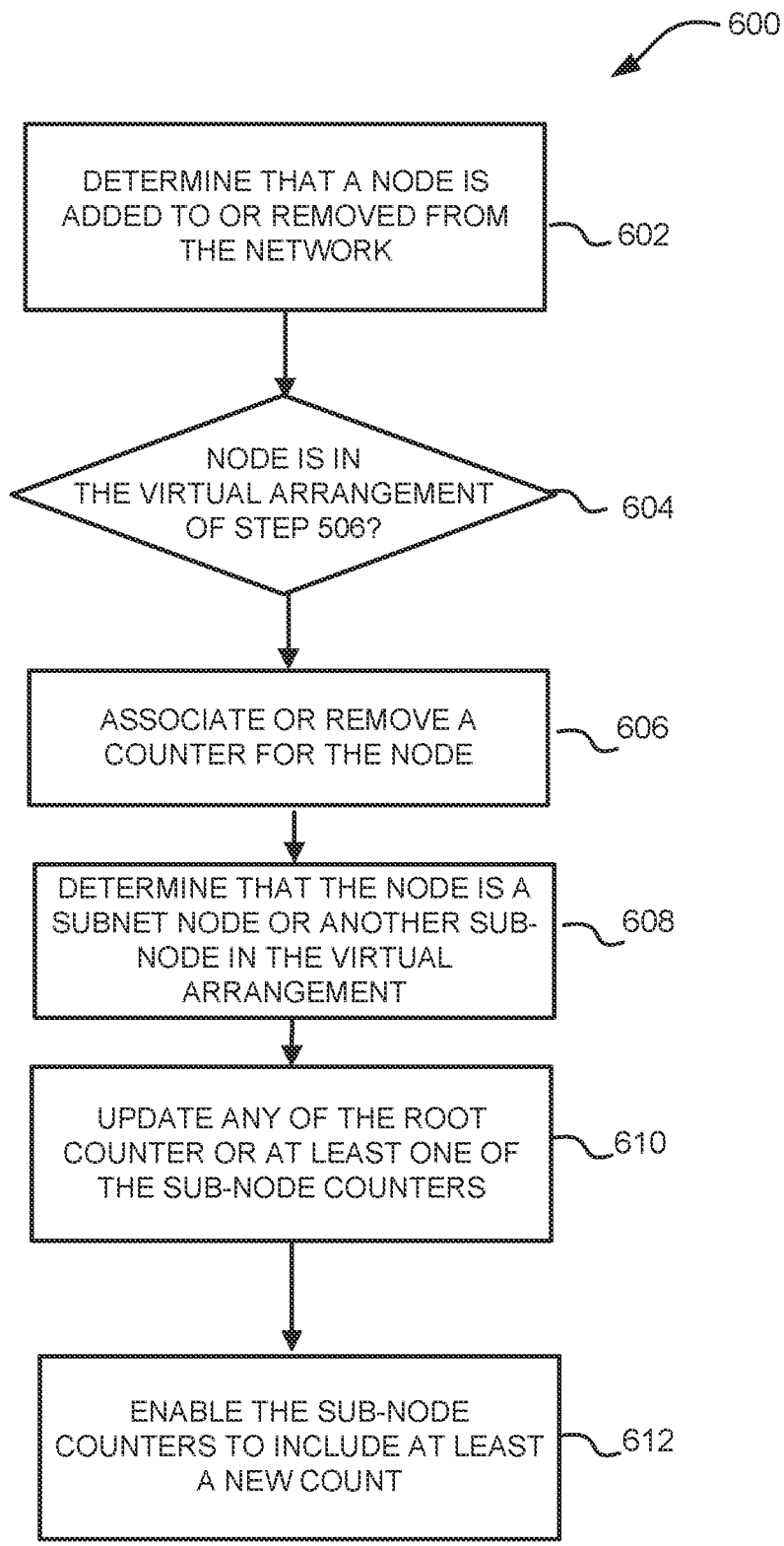
FIG. 6 illustrates a process flow to support provision of a network address associated with an LPM using a virtual arrangement of nodes having respective counters, according to at least one embodiment.

FIG. 6 illustrates process flow or method 600 to support provision of a network address associated with an LPM using a virtual arrangement of nodes having respective counters, according to at least one embodiment. The method 600 in FIG. 6 may supplement or support the method 500 of FIG. 5. The method 600 in FIG. 6 includes determining 602 that a node is added to or removed from the network. A verification 604 may be performed that the node at issue is part of a virtual arrangement, such as, from step 506 in FIG. 5. Otherwise, a virtual arrangement may be generated for a network associated with the determination 602, such as using the approaches described with respect to at least FIGS. 2 and 3. The method 600 includes associating or removing 606 a counter for the node. To supplement the associating or removing 606 step, the method 600 includes determining 608 that the node is a subnet node or another sub-node in the virtual arrangement. The method 600 includes updating 610 any of the root counter or at least one of the sub-node counters. The update 610 may be associated with an enabling 612 step to include at least a new count associated with the network addresses belonging to the node.

Figure 7A:
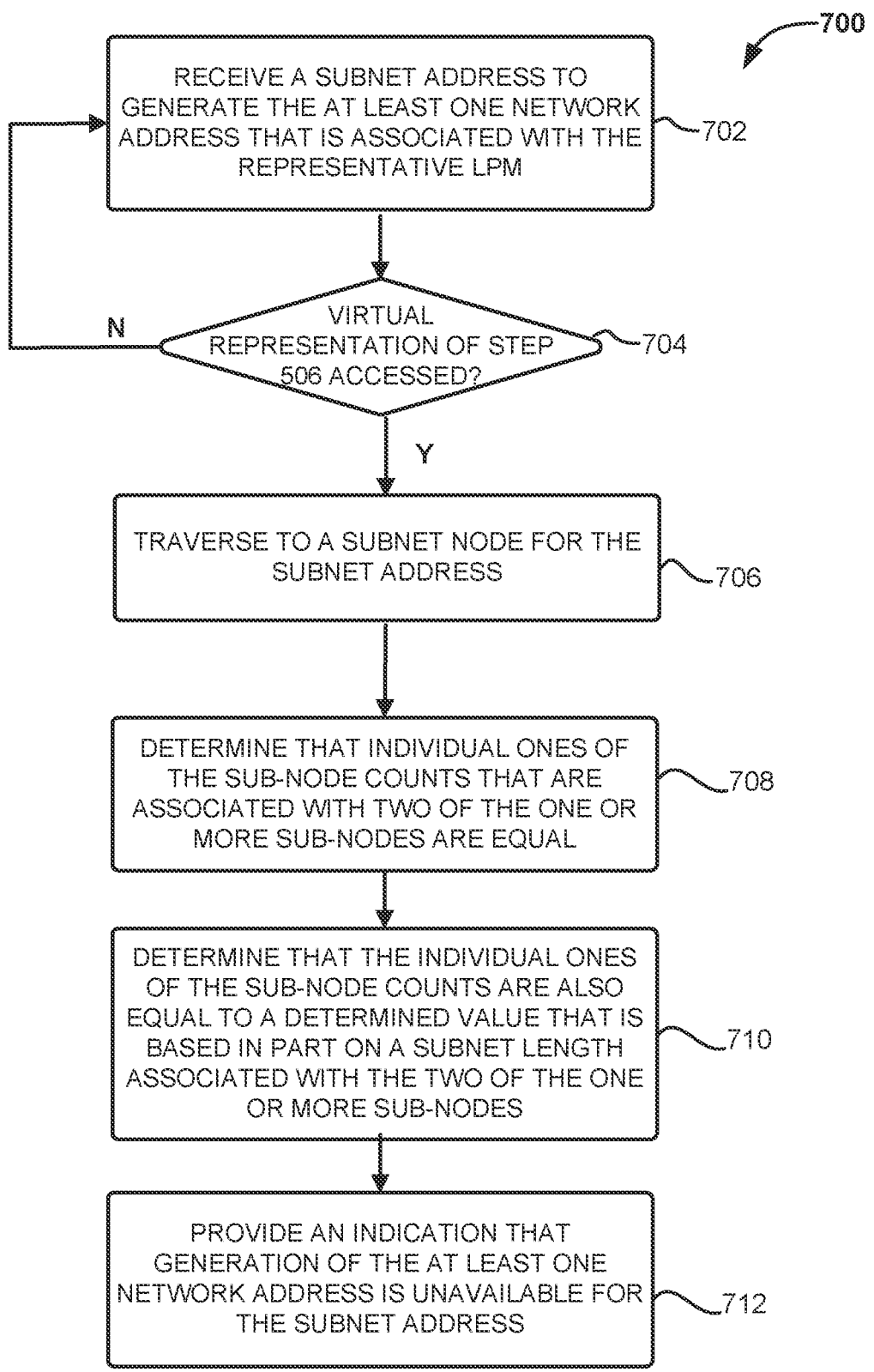
FIG. 7A illustrates another process flow to support provision of a network address associated with an LPM using a virtual arrangement of nodes having respective counters, according to at least one embodiment.

FIG. 7A illustrates another process flow or method 700 to support provision of a network address associated with an LPM using a virtual arrangement of nodes having respective counters, according to at least one embodiment. The method 700 in FIG. 7A may supplement or support one or more of the method 600 of FIG. 6 or the method 500 of FIG. 5. The method 700 in FIG. 7A includes receiving 702 a subnet address to generate the at least one network address that is associated with the representative LPM. A verification 704 may be performed that the node at issue is part of a virtual arrangement, such as from step 506 in FIG. 5. Otherwise, a virtual arrangement may be generated for a network based in part on the determination 704, such as using the approaches described with respect to at least FIGS. 2 and 3. The method 700 includes traversing 706 to a subnet node for the subnet address. The method 700 includes determining 708 that individual ones of the sub-node counts, which are associated with two of the one or more sub-nodes, are also equal. In at least one embodiment, the method 700 includes a further determining 710 that the individual ones of the sub-node counts are also equal to a determined value. The determined value is based in part on a subnet length associated with the two of the one or more sub-nodes. The method 700 includes providing 712 an indication that generation of the at least one network address is unavailable for the subnet address.

In at least one embodiment, the method 700 may include a further step or sub-step for receiving a subnet address to generate the at least one network address that is associated with the representative LPM. Here too, a verification may be performed that the node at issue is part of a virtual arrangement, such as from step 506 in FIG. 5. Otherwise, a virtual arrangement may be generated for a network associated with the determination, such as using the approaches described with respect to at least FIGS. 2 and 3. The method 700 includes a further step or sub-step of traversing to a subnet node for the subnet address, as in step 704. The method 700 includes a further step or sub-step for determining that at least one of the individual ones of the sub-node counts are also not equal to a determined value. Here, different than in step 710, the determined value is based in part on a node level. The method 700 may include providing a sub-node that is associated with the at least one of the individual ones of the sub-node counts to be associated with the subnet address.

In at least one embodiment, the method 700 may include yet another step or sub-step for receiving the subnet addresses from the network, where the network includes at least one network end point to enable network communications. Then, the method 700 may include a step for populating the virtual arrangement based in part on the subnet addresses. The method 700 includes generating information for the root node or for the one or more sub-nodes using an input to the virtual arrangement and using the first counter and the sub-node counters. For example, information for testing and performance analysis may be used to modify the network 100 in FIG. 1. The method 700 may, therefore, include enabling a change in the network based in part on the information generated.

Figure 7B:
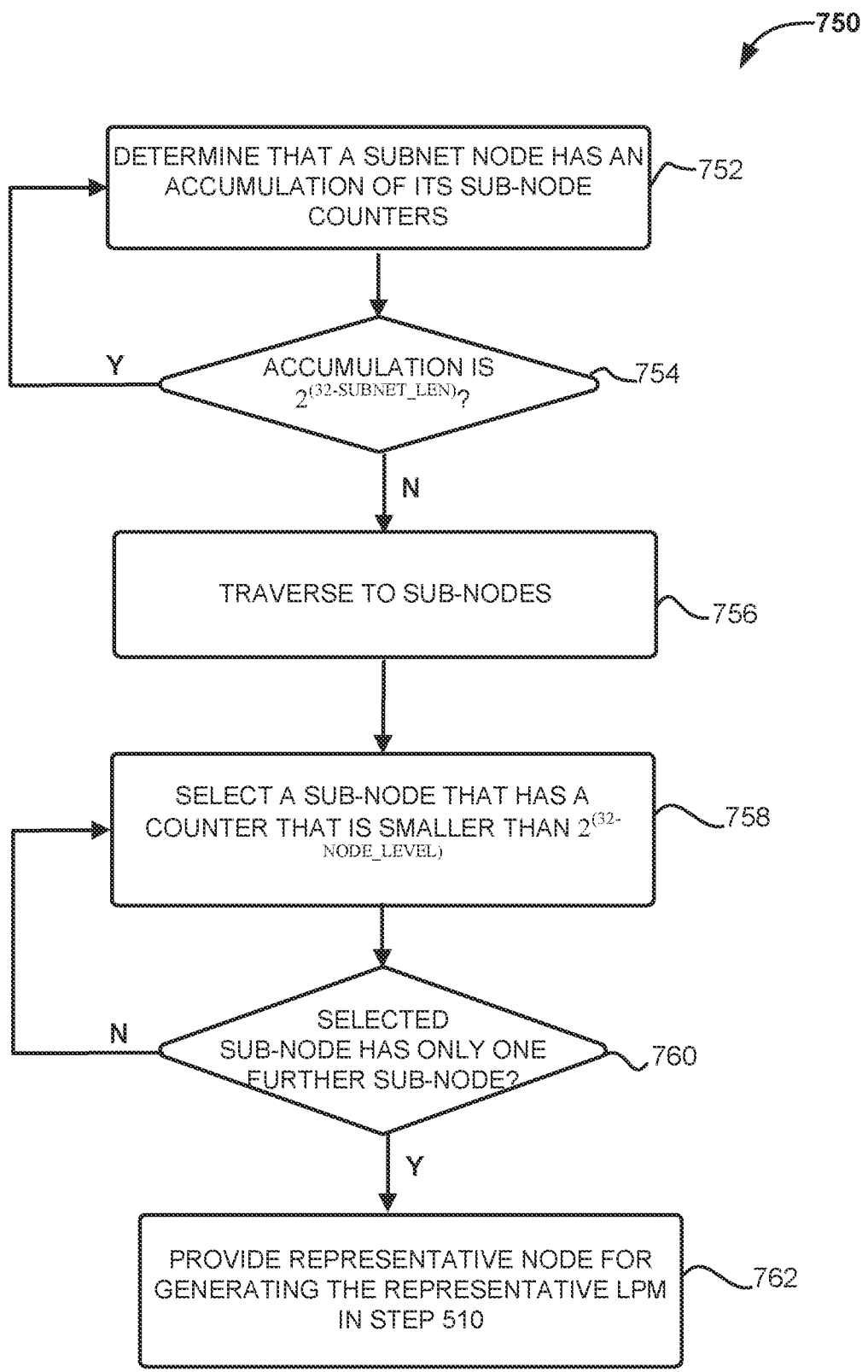
FIG. 7B illustrates yet another process flow to support provision of a network address associated with an LPM using a virtual arrangement of nodes having respective counters, according to at least one embodiment.

FIG. 7B illustrates yet another process flow or method 750 to support provision of a network address associated with an LPM using a virtual arrangement of nodes having respective counters, according to at least one embodiment. The method 750 may supplement or support one or more of the method 600 of FIG. 6 or the method 500 of FIG. 5. The method 750 in FIG. 7B includes determining 752 that a subnet node has an accumulation of its sub-node counters from sub-nodes below the subnet node. The method 750 includes a verification 754 that such an accumulation is $2^{(32-subnet\_len)}$. When the verification 754 is indeed the case, then it may be determined that no network address can be an LPM on this subnet node. The determination 752 for the accumulation may be performed on other subnet nodes. When the verification 754 is in the negative, traversal 756 may occur to the sub-nodes.

The method 750 includes selecting 758 a sub-node that has a counter that is smaller than $2^{(32-node\_level)}$. A verification 760 may be performed that the selected sub-node has one further sub-node below it. When the verification 760 is negative the selecting 758 may be performed for other sub-nodes. When the verification 760 is indeed the case, then a representative sub-node under the selected sub-node may be provided 762 for generating the representative LPM as in step 510.

In at least one embodiment, computer and processor aspects of a network 100 may be used herein, according to at least one embodiment. The computer and processor aspects may be performed by one or more processors that include a system-on-a-chip (SOC) or some combination thereof formed with a processor that may include execution units to execute an instruction, according to at least one embodiment. Such one or more processors may include CPUs, DPUs, and GPUs and may be within one of such leaf switches or spine switches described all throughout herein. Further, the computer and processor aspects may be within one or more of the Ethernet hosts or the Ethernet/Interconnect devices herein.

In at least one embodiment, the computer and processor aspects may include, without limitation, a component, such as a processor to employ execution units including logic to perform algorithms for process data, in accordance with present disclosure, such as in embodiment described herein. In at least one embodiment, the computer and processor aspects may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, the computer and processor aspects may execute a version of WINDOWS® operating system available from Microsoft® Corporation of Redmond, Wash., although other operating systems (UNIX® and Linux®, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, the computer and processor aspects may include, without limitation, a processor that may include, without limitation, one or more execution units to perform aspects according to techniques described with respect to at least one or more of FIGS. 1-7 herein. In at least one embodiment, the computer and processor aspects is a single processor desktop or server system, but in another embodiment, the computer and processor aspects may be a multiprocessor system.

In at least one embodiment, the processor may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, a processor may be coupled to a processor bus that may transmit data signals between processor and other components in computer and processor aspects.

In at least one embodiment, a processor may include, without limitation, a Level 1 ("L1") internal cache memory ("cache"). In at least one embodiment, a processor may have a single internal cache or multiple levels of internal cache. In at least one embodiment, cache may reside external to a processor. Other embodiments may also include a combination of both internal and external caches depending on particular implementation and needs. In at least one embodiment, a register file may store different types of data in various registers including, without limitation, integer registers, floating point registers, status registers, and an instruction pointer register.

In at least one embodiment, an execution unit, including, without limitation, logic to perform integer and floating point operations, also resides in a processor. In at least one embodiment, a processor may also include a microcode ("ucode") read only memory ("ROM") that stores microcode for certain macro instructions. In at least one embodiment, an execution unit may include logic to handle a packed instruction set.

In at least one embodiment, by including a packed instruction set in an instruction set of a general-purpose processor, along with associated circuitry to execute instructions, operations used by many multimedia applications may be performed using packed data in a processor. In at least one embodiment, many multimedia applications may be accelerated and executed more efficiently by using a full width of a processor's data bus for performing operations on packed: data, which may eliminate a need to transfer smaller units of data across that processor's data bus to perform one or more operations one data element at a time.

In at least one embodiment, an execution unit may also be used in microcontrollers, embedded processors, graphics devices, DSPs, and other types of logic circuits. In at least one embodiment, the computer and processor aspects may include, without limitation, a memory. In at least one embodiment, a memory may be a Dynamic Random Access Memory ("DRAM") device, a Static Random Access Memory ("SRAM") device, a flash memory device, or another memory device. In at least one embodiment, a memory may store instruction(s) and/or data represented by data signals that may be executed by a processor.

In at least one embodiment, a system logic chip may be coupled to a processor bus and a memory. In at least one embodiment, a system logic chip may include, without limitation, a memory controller hub ("MCH"), and processor may communicate with MCH via processor bus. In at least one embodiment, an MCH may provide a high bandwidth memory path to a memory for instruction and data storage and for storage of graphics commands, data and textures. In at least one embodiment, an MCH may direct data signals between a processor, a memory, and other components in the computer and processor aspects and to bridge data signals between a processor bus, a memory, and a system I/O interface. In at least one embodiment, a system logic chip may provide a graphics port for coupling to a graphics controller. In at least one embodiment, an MCH may be coupled to a memory through a high bandwidth memory path and a graphics/video card may be coupled to an MCH through an Accelerated Graphics Port ("AGP") interconnect.

In at least one embodiment, the computer and processor aspects may use a system I/O interface as a proprietary hub interface bus to couple an MCH to an I/O controller hub ("ICH"). In at least one embodiment, an ICH may provide direct connections to some I/O devices via a local I/O bus. In at least one embodiment, a local I/O bus may include, without limitation, a high-speed I/O bus for connecting peripherals to a memory, a chipset, and processor. Examples may include, without limitation, an audio controller, a firmware hub ("flash BIOS"), a wireless transceiver, a data storage, a legacy I/O controller containing user input and keyboard interfaces, a serial expansion port, such as a Universal Serial Bus ("USB") port, and a network controller. In at least one embodiment, data storage may comprise a hard disk drive, a floppy disk drive, a CD-ROM device, a flash memory device, or other mass storage device.

In at least one embodiment, the computer and processor aspects herein includes interconnected hardware devices or "chips", whereas in other embodiments, these may include an exemplary SoC. In at least one embodiment, devices illustrated in the figures here may be interconnected with proprietary interconnects, standardized interconnects (e.g., PCIe®) or some combination thereof. In at least one embodiment, one or more components of the computer and processor aspects herein are interconnected using compute express link (CXL) interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or inter-process communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system for providing network addresses in a network, comprising:
one or more circuits to receive subnet addresses of the network, to provide a virtual arrangement of the subnet addresses based in part on a root node with a root counter and one or more sub-nodes with respective sub-node counters, wherein the one or more sub-nodes are subject to an addition or removal of a sub-node, and to use the virtual arrangement to generate at least one network packet with a network address that is associated with a representative longest prefix match (LPM), the representative LPM comprising a prefix from the root node to a representative node and a suffix that is based in part on a node level of the representative node with respect to the root node, the representative node being a lower absent sub-node relative to a subnet node in the virtual arrangement and based in part on a count from one or more of the root counter or the sub-node counters, the count comprising an update to one or more of the root counter or the sub-node counters to represent, in the network addresses, the addition or removal of the sub-node.

2. The system of claim 1, wherein the one or more circuits are further to:
provide the root counter to comprise a first count that is of unique ones of the network addresses that belong to the one or more sub-nodes in the virtual arrangement; and
provide the sub-node counters to comprise respective sub-node counts that is of unique ones of the network addresses that belong to respective ones of the one or more sub-nodes, wherein the sub-node counters comprise at least one subnet counter to comprise respective subnet counts of the network address that belong to the subnet node.

3. The system of claim 1, wherein the one or more circuits are further to:
determine that the sub-node is added to or removed from the network; and
associate or remove a counter for the sub-node.

4. The system of claim 1, wherein the subnet node is associated with a node level with respect to the root node and is associated with a subnet length or mask, wherein the node level represents a one-bit value in a bit representation of the subnet node and wherein subnet length or mask is used to determine a number of bits inserted to the bit representation.

5. The system of claim 1, wherein a first one of sub-node counts within the sub-node counters comprises a first determined value for a first one of the one or more sub-nodes that is the subnet node, wherein first determined value is based in part on a subnet length or mask associated with the subnet node, and wherein a second one of the sub-node counts within the sub-node counters comprises a second determined value representing an accumulation of all of the network addresses that are unique for at least a second one of the one or more sub-nodes that is not the subnet node.

6. The system of claim 1, wherein the one or more circuits are further to:
enable a change the network based in part on addition of the lower absent sub-node to the virtual arrangement, wherein the lower absent sub-node is also implemented into the network to allow generation of the at least one network packet.

7. The system of claim 1, wherein the one or more circuits are further to:
receive a subnet address to generate the network address that is associated with the representative LPM;
traverse to the subnet node for the subnet address;
determine that individual ones of sub-node counts, within the sub-node counters and which are associated with two of the one or more sub-nodes, are equal;
determine that the individual ones of the sub-node counts are also equal to a determined value, the determined value based in part on a subnet length associated with the two of the one or more sub-nodes; and
provide an indication that generation of the network address is unavailable for the subnet address.

8. The system of claim 1, wherein the one or more circuits are further to:
receive a subnet address to generate the network address that is associated with the representative LPM;
traverse to the subnet node for the subnet address;
determine that at least one of sub-node counts, within the sub-node counters, is not equal to a determined value, the determined value based in part on a node level; and
provide a sub-node associated with the at least one of the sub-node counts to be associated with the subnet address.

9. The system of claim 1, wherein a number of operations for generation of the network address is only based in part on a number of levels in the virtual arrangement, wherein the number of levels is associated with the one or more sub-nodes being at different levels with respect to the root node.

10. The system of claim 1, wherein the one or more circuits are further to:
receive the subnet addresses from the network, the network comprising at least one network end point to enable network communications;
populate the virtual arrangement based in part on the subnet addresses;
generate information for the root node or for the one or more sub-nodes using an input to the virtual arrangement and using the root counter and the sub-node counters; and
enable a change in the network based in part on the information generated.

11. A system for coverage of network addresses in a network, comprising:
at least one network end point to provide communication in the network, to enable a change in the network based in part on an input to the at least one network end point, and to support generation of at least one network packet with a network address that is associated with a representative longest prefix match (LPM), the input based in part on a virtual arrangement of the network, the virtual arrangement based in part on a root node with a root counter and one or more sub-nodes with respective sub-node counters, wherein the one or more sub-nodes are subject to an addition or removal of a sub-node, the virtual arrangement to be used to provide the network address, the representative LPM comprising a prefix from the root node to a representative node and a suffix that is based in part on a node level of the representative node with respect to the root node, the representative node being a lower absent sub-node relative to a subnet node in the virtual arrangement and based in part on a count from one or more of the root counter or the sub-node counters, the count comprising an update to one or more of the root counter or the sub-node counters to represent, in the network addresses, the addition or removal of the sub-node.

12. The system of claim 11, wherein the subnet node is associated with a node level with respect to the root node and is associated with a subnet length or mask, wherein the node level represents a one-bit value in a bit representation of the subnet node and wherein subnet length or mask is used to determine a number of bits inserted to the bit representation.

13. The system of claim 11, wherein a first one of sub-node counts within the sub-node counters comprises a first determined value for a first one of the one or more sub-nodes that is a subnet node, wherein first determined value is based in part on a subnet length or mask associated with the subnet node, and wherein a second one of the sub-node counts within the sub-node counters comprises a second determined value representing an accumulation of all of the network addresses that are unique for at least a second one of the one or more sub-nodes that is not the subnet node.

14. A method for providing network addresses in a network, the method comprising:
receiving subnet addresses for the network;
providing a virtual arrangement of the subnet addresses using a root node with a root counter and one or more sub-nodes with respective sub-node counters, wherein the one or more sub-nodes are subject to an addition or removal of a sub-node; and
generating at least one network packet with a network address that is associated with a representative longest prefix match (LPM), the representative LPM comprising a prefix from the root node to a representative node and comprising a suffix that is based in part on a node level of the representative node with respect to the root node, the representative node being a lower absent sub-node relative to a subnet node in the virtual arrangement and based in part on a count from one or more of the root counter or the sub-node counters, the count comprising an update to one or more of the root counter or the sub-node counters to represent, in the network addresses, the addition or removal of the sub-node.

15. The method of claim 14, further comprising:
providing the root counter to comprise a first count that is of unique ones of the network addresses that belong to the one or more sub-nodes in the virtual arrangement; and
providing the sub-node counters to comprise respective sub-node counts that is of unique ones of the network addresses that belong to respective ones of the one or more sub-nodes, wherein the sub-node counters comprise at least one subnet counter to comprise respective subnet counts of the network address that belong to the subnet node.

16. The method of claim 14, further comprising:
determining that the sub-node is added to or removed from the network; and
associating or removing a counter for the sub-node.

17. The method of claim 14, further comprising:
enable a change the network based in part on addition of the lower absent sub-node to the virtual arrangement, wherein the lower absent sub-node is also implemented into the network to allow generation of the at least one network packet.

18. The method of claim 14, further comprising:
receiving a subnet address to generate the network address that is associated with the representative LPM;
traversing to the subnet node for the subnet address;
determining that individual ones of sub-node counts, within the sub-node counters and which are associated with two of the one or more sub-nodes, are equal;
determining that the individual ones of the sub-node counts are also equal to a determined value, the determined value based in part on a subnet length associated with the two of the one or more sub-nodes; and
providing an indication that generation of the network address is unavailable for the subnet address.

19. The method of claim 14, further comprising:
receiving a subnet address to generate the network address that is associated with the representative LPM;
traversing to the subnet node for the subnet address;
determining that at least one of sub-node counts, within the sub-node counters, is not equal to a determined value, the determined value based in part on a node level; and
providing a sub-node associated with the at least one of the sub-node counts to be associated with the subnet address.

20. The method of claim 14, further comprising:
receiving the subnet addresses from the network, the network comprising at least one network end point to enable network communications;
populating the virtual arrangement based in part on the subnet addresses;
generating information for the root node or for the one or more sub-nodes using an input to the virtual arrangement and using the root counter and the sub-node counters; and
enabling a change in the network based in part on the information generated.

* * * * *